(12) United States Patent
Griffith (10) Patent No.: US 9,721,256 B2
(45) Date of Patent: Aug. 1, 2017

(54) SYSTEM AND METHOD FOR PROVIDING SECURE PRODUCT DATA COLLECTION, MONITORING, AND TRACKING

(71) Applicant: Massachusetts Institute of Technology, Cambridge, MA (US)

(72) Inventor: Kenfield Allistair Griffith, Cambridge, MA (US)

(73) Assignee: Massachusetts Institue of Technology, Cambridge, MA (US)

( * ) Notice: Subject to any disclaimer, the term of this patent is extended or adjusted under 35 U.S.C. 154(b) by 162 days.

(21) Appl. No.: 13/966,945

(22) Filed: Aug. 14, 2013

(65) Prior Publication Data

US 2013/0329889 A1 Dec. 12, 2013

Related U.S. Application Data

(63) Continuation-in-part of application No. 13/437,857, filed on Apr. 2, 2012, now abandoned.

(60) Provisional application No. 61/471,100, filed on Apr. 1, 2011.

(51) Int. Cl.
G06F 21/00 (2013.01)
G06Q 30/00 (2012.01)
G06Q 30/02 (2012.01)
H04W 12/00 (2009.01)

(52) U.S. Cl.
CPC ........... *G06Q 30/016* (2013.01); *G06Q 30/02* (2013.01); *H04W 12/00* (2013.01)

(58) Field of Classification Search
USPC .......................................................... 705/51
See application file for complete search history.

(56) References Cited

U.S. PATENT DOCUMENTS

| 6,112,187 A * | 8/2000 | Fukawa ......................... 705/18 |
| 7,178,168 B2 * | 2/2007 | Gammel .................. G06F 5/01 380/262 |
| 7,278,017 B2 * | 10/2007 | Skantze ............... H04L 9/0825 380/258 |
| 8,131,266 B2 * | 3/2012 | Cai ........................ G06Q 20/20 345/633 |
| 8,229,861 B1 | 7/2012 | Trandal et al. |
| 2001/0053980 A1 | 12/2001 | Suliman, Jr. et al. |
| 2003/0004737 A1 | 1/2003 | Conquest et al. |
| 2004/0174994 A1* | 9/2004 | Jiraki ....................... H04L 9/34 380/28 |
| 2005/0133595 A1 | 6/2005 | Tanase |
| 2005/0192816 A1 | 9/2005 | Wechsel |

(Continued)

*Primary Examiner* — Zeshan Qayyum
(74) *Attorney, Agent, or Firm* — Peter A. Nieves; Sheehan Phinney Bass & Green PA (57) ABSTRACT

A system for providing product data collection, monitoring, and tracking contains a memory and a processor configured by the memory to perform the steps of: receiving product information and a scannable code; creating and assigning a unique product identifier to the received product information and associated scannable code; receiving customer registration information; creating and assigning a unique customer identifier to the received customer information; associating the unique product identifier with the unique customer identifier; and after receiving the scannable code from a remote device, providing the remote device with access to the received product information. The collected structured and/or unstructured data is secured during transit.

8 Claims, 10 Drawing Sheets

(56) References Cited

U.S. PATENT DOCUMENTS

| | | |
|---|---|---|
| 2005/0240498 A1 | 10/2005 | Thaler |
| 2006/0095289 A1 | 5/2006 | Bunning |
| 2006/0184379 A1 | 8/2006 | Tan et al. |
| 2006/0212357 A1 | 9/2006 | White et al. |
| 2010/0145754 A1 | 6/2010 | Rahman |
| 2010/0274692 A1* | 10/2010 | Hammad ............... G06Q 20/12 705/30 |
| 2011/0264594 A1 | 10/2011 | Govindaraju |

* cited by examiner

SYSTEM AND METHOD FOR PROVIDING SECURE PRODUCT DATA COLLECTION, MONITORING, AND TRACKING

CROSS-REFERENCE TO RELATED APPLICATION

This application claims priority to U.S. Provisional Application entitled, "(QR) DATA COLLECTION, MONITORING, AND TRACKING LABELS FOR PRODUCT WARRANTY," having Ser. No. 61/471,100, filed Apr. 1, 2011, and copending U.S. Application entitled "SYSTEM AND METHOD FOR PROVIDING PRODUCT DATA COLLECTION, MONITORING, AND TRACKING" having Ser. No. 13/437,857, filed Apr. 2, 2012, which are entirely incorporated herein by reference.

FIELD OF THE INVENTION

The present invention is generally related to product quality assurance and customer relations, and more particularly is related to electronic product feedback.

BACKGROUND OF THE INVENTION

Product designing in remote communities that are developing regions varies due to circumstances such as, but not limited to, housing, sanitation, local policy, and mobile technology intervention. In the content of developing countries, or where there is a significant distance between the user and the product designer, it is difficult to reflect or iterate with the intellectual and visual absence of local context. As a result, it is very complex and challenging to define a consistent product design process in such developing regions. Examples of such regions may include, but is not limited to, South Asia, the Philippines, Latin America, and Africa.

Increased distance between the product designer and the user/client results in minimal useful, if any, feedback to the designer. The typical chain of product delivery includes manufacturer to supplier, supplier to distributor, distributor to vendor, and finally, vendor to customer. Since product designers wish to maintain desire for their products, which often requires measuring product feedback, product designers often look for different means of collecting and processing product information to be embedded iteratively in the product design solution.

Computation has been used as a medium to aid the iterative process of design such that information about the design can be saved, manipulated, reproduced, and "redesigned" expeditiously. Unfortunately, product design in such remote communities where customers are a significant distance away, does not provide sufficient knowledge of the context, client, and environment.

Quite often a customer has the desire to view specific information regarding a product that they have purchased. An example of such information may be the warranty on the product. Obtaining the product warranty from a designer in a remote location, or from any other party along the chain of product delivery, can be a difficult task. A more user-friendly process is needed for obtaining such product information.

Data entered via mobile phones are susceptible to being intercepted. Most forms of data collected through product tracking include personal information that can be traced back to an individual and make the transmission vulnerable. For example, if a certain drug company wishes to register all their patients/users that use a certain drug through mobile phones, the drug used may have certain health implications that may put the identity of the user at risk.

As more and more data are entered via mobile phone, it is important that security measures are put in place to not only protect the privacy of the individual entering the data, but protects the entity compiling, hosting, and extracting the data.

Data in emerging markets is a scarce commodity to make decisions and to design sustainable solutions. Over the years, most data/information is accessed through mobile devices in emerging markets requiring advance processes for managing and securing such data. Traditional methods of data collection do not apply and therefore require interventions from mobile device to remote servers, where most calculations are done. Thus, a heretofore unaddressed need exists in the industry to address the aforementioned deficiencies and inadequacies.

SUMMARY OF THE INVENTION

Embodiments of the present invention provide a system and method for providing product data collection, monitoring, and tracking. Briefly described, in architecture, one embodiment of the system, among others, can be implemented as follows. The system contains a memory and a processor configured by the memory to perform the steps of: receiving product information and a scannable code; creating and assigning a unique product identifier to the received product information and associated scannable code; receiving customer registration information; creating and assigning a unique customer identifier to the received customer information; associating the unique product identifier with the unique customer identifier; and after receiving the scannable code from a remote device, providing the remote device with access to the received product information. Data communicated between the processor and the remote device comprise an SMS message transmitted through a virtual private network as encrypted structured and/or unstructured data.

Briefly described, in architecture, another aspect of the invention can be implemented as follows. A method for secure SMS communication, includes the steps of receiving an SMS message containing structured and/or unstructured data by an SMSC gateway in a mobile network operator network, encrypting the message with a time variable attached, shifting an encryption byte with an encrypted time-key, and transmitting the encrypted message.

A variation on a method for secure SMS communication includes the steps of receiving an encrypted SMS message including structured and/or unstructured data from an SMSC gateway in a mobile network operator network, splitting a message key from message data, decoding the message key, decoding a time variable, and determining if the time variable is within a time window. If the message was received outside the time window, the message is discarded. Otherwise the message is decoded.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

The present invention addresses how structured and/or unstructured information is processed and embedded into a structured design solution. In addition, the present invention addresses how to design collectively with distributed sources of information when the designer is removed from the physical context of the solution. Exemplary embodiments include providing secure transfer of the structured and/or unstructured information.

The present system and method is provided for the secure collection of information and data using mobile devices, such as, but not limited to, a mobile phone, from rural and urban regions. The collection of data is used to aid a designer in constructing design context. The system and method mediates the distance when the designer has limited access to the physical context of the solution. The system and method is provided to enable a designer to make inferred decisions despite his/her distance away from the context and to embed new perspective throughout the design process, mimicking the traditional design process where proximity is not a concern.

While in the present description a mobile phone is described as an exemplary mobile device that may be used in accordance with the present invention, it should be noted that other mobile devices may be used instead.

As the designer is removed from context, information becomes increasingly difficult to gather especially in extremely remote and less developed regions. Proximity therefore becomes non-existent such that an intervention is necessary to reinstate some measure of proximity between designer and user. In accordance with the present system and method, the interventions used are a mobile device and computation. These interventions, as provided by the present system and method, provide for capturing community information from multiple sources in parallel at extreme distances apart.

Information received from communities is deemed as unstructured until a designer structures and processes the necessary information into a design solution. In accordance with the present invention, the system and method provides a computational platform to aid information processing for sustainable and holistic design intervention. The system and method uses mobile surveys, which gather data from communities in which the design intervention is needed.

The present system and method focuses on getting data as information directly from the client and the collaboration between designers and clients as users who possess tacit knowledge of the context. Although tacit knowledge becomes embedded in the experiential exposure of the user to the environment, the computation intervention developed herein affords the designer the ability to collect information from users that is otherwise difficult to access. The information and processing of the information creates the tacit knowledge for a designer to be embedded in the design process of the artifact as well as bringing the designer "up to speed" with the environment. As a result, the users of the product guide the design process for sustainable results.

The present invention performs the abovementioned by allowing a customer, manufacturer, retailer, and any other entity within a product chain, to enter and update information regarding a product purchased by the customer. Quick Response (QR) codes and mobile devices may be used for tracking product information, such as, but not limited to, product warranty information. It should be noted that while the present description refers to use of QR codes, it should be appreciated that another bar code may be used to embed information. In fact, the present invention is not limited to use of bar codes, but instead, it is intended to cover use of other methods for quickly providing an association with a product. As an example, a number code may instead be used, which is associated with the product, or a simple bar code. The point being that typing in, scanning, or another method of entering quick data may be used to pull up reference to the associated product.

It should be noted that while the present description provides for use of a mobile phone as the mobile device, any other mobile device capable of providing the functionality described herein may be used instead. In addition, as is described in additional detail herein, the present description provides for a single database capable of storing information provided by a manufacturer, a retailer, and any other party within the chain of a product. It should be noted, however, that instead of a single database, there may instead be multiple databases, such as, for example, one database for the manufacture and a separate database for the retailer. However, in such an embodiment, the data stored on the databases would need to be synchronized so as to provide consistent data for use by the present system and method.

Figure 1:
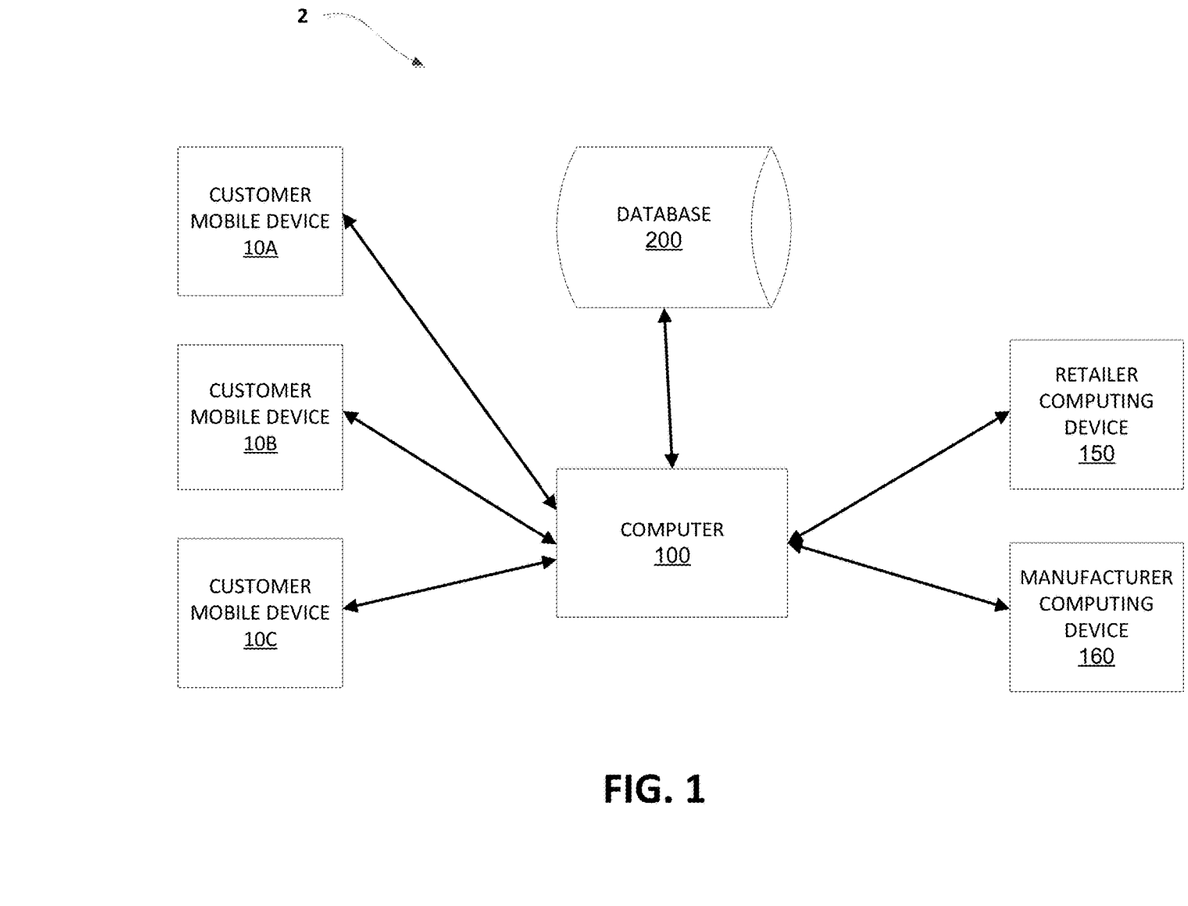
FIG. 1 is a schematic diagram illustrating a general network in which the present system and method may be provided.
Figure 2:
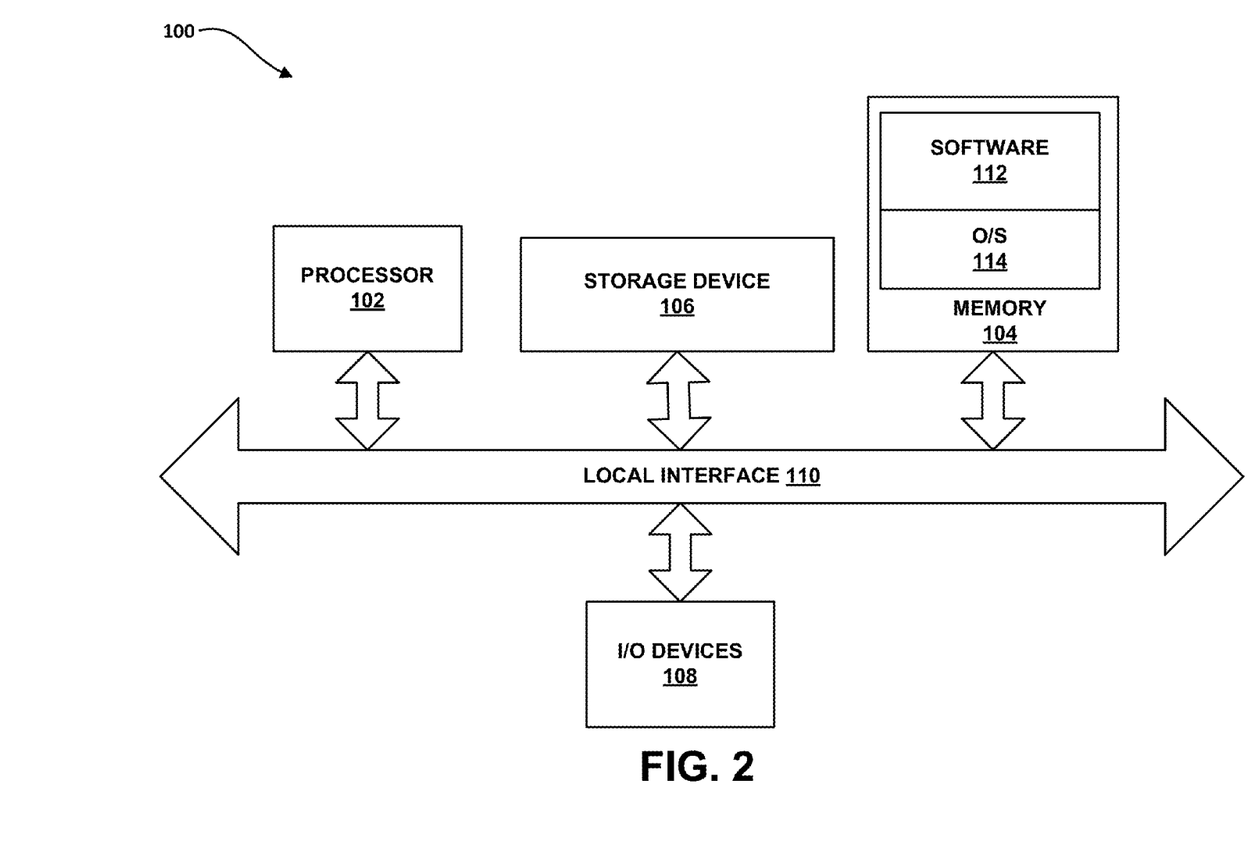
FIG. 2 is a schematic diagram illustrating a general computer located within the general network of FIG. 1.

FIG. 1 is a schematic diagram illustrating a general network 2 in which the present system and method may be provided. As shown by FIG. 1, the network 2 contains a general computer 100. The general computer 10 contains logic stored therein that provides the functionality of the present system and method, as is described in additional detail herein. FIG. 2 is a schematic diagram further illustrating the general computer 100 of FIG. 1.

Returning to FIG. 1, the network 2 also contains a database 200 for storing data representative of a product (i.e., product information) such as, but not limited to, a product warranty time, a product warranty description, a product name, a product UPC, a product serial number, a product manual, a unique product identifier, a list of parts of the product, pointers to parts of the product, product return information, product repair instructions, product retailer identification, product manufacturer information, an indicator that the product has been returned, an indicator that a warranty claim has been made for the product, a rebate amount given, a rebate date, terms of agreement, and other product specific information. In addition, the database 200 may have stored therein customer information such as, but not limited to, an assigned customer unique account identifier, customer biographic information, and customer demographic information. Further, manufacturer information may also be stored within the database 200 including, but not limited to, manufacturer name, manufacturer biographic and demographic information, and a manufacturer unique account identifier. Still further, retailer information may also be stored within the database 200 including, but not limited to, retailer name, retailer biographic and demographic information, and a retailer unique account identifier. Of course, other information may also be stored on the database 200.

Returning to FIG. 1, multiple customer mobile devices 10A, 10B, 10C are provided within the network 2. Customer mobile devices 10 allow associated customers to interact with the present system and method, as is described in further detail herein. For exemplary purposes, the present description provides for the customer mobile devices to be mobile phones, however, one having ordinary skill in the art would appreciate that the customer mobile devices may be any mobile devices capable of allowing customers to interact with the general computer 100, wherein the customer mobile devices are capable of communicating instructions to the general computer 100 and allowing associated users of the customer mobile devices 10 to view, interact, and/or hear information provided back to the customers via the customer mobile devices, from the general computer 100. Specifically, the customer mobile device contains a memory, a processor, and input/output means for allowing the associated customer to view, interact, and/or hear information provided. As an example, as is described in additional detail herein, to allow the customer to scan a bar code associated with a purchased product for registration purposes, the customer mobile device 10 may contain infrared scanning capability or a different scanning capability. Since one having ordinary skill in the art would know how the infrared and other scanning capabilities are provided within a mobile device, further description of this technology is not provided herein. Of course, a separate I/O scanning device may communicate with the customer mobile device 10 instead.

Other examples of customer mobile devices 10 may be, but are not limited to, a laptop computer, mobile phone, tablet PC, or other mobile devices. It should be noted that while three customer mobile devices 10A, 10B, 10C are illustrated by FIG. 1, one or more customer mobile devices 10 may be provided within the network.

The network 2 also contains a retailer computing device 150, which is capable of allowing a retailer to communicate with the network. The retailer computing device 150 communicates with the general computer 100. The retailer computing device 150 may be a general purpose computer, similar in structure to the general computer 100, which is described in additional detail with regard the FIG. 2, or the retailer computing device 150 may be similar in structure to the customer mobile device 10. As is described in additional detail herein, the retailer computing device 150 allows a retailer to upload data into a database 200. The retailer can also query the system for sales, customers, and a snapshot of their market demand. It should be noted that while one retailer computing device 150 is illustrated by FIG. 1, one or more retailer computing device 150 may be provided within the network 2.

The network 2 also contains a manufacturer computing device 160, which is capable of allowing a manufacturer to communicate with the network 2. The manufacturer computing device 160 communicates with the general computer 100. The manufacturer computing device 160 may be a general purpose computer, similar in structure to the general computer 100, which is described in additional detail with regard the FIG. 2, or the manufacturer computing device 160 may be similar in structure to the customer mobile device 10. As is described in additional detail herein, the manufacturer computing device 160 allows a manufacturer to upload data into a database 200. The manufacturer can view information regarding the distribution mapping of products, the replenish rate of retailers, and customer data. It should be noted that while one manufacturer computing device 160 is illustrated by FIG. 1, one or more manufacturer computing device 160 may be provided within the network 2.

Communication between the customer mobile devices 10 and the general computer 100 may be provided via the Internet, USSD, SMS, IVR, Wireless Networks and other methods of communication. In addition, communication between either the retailer computing device 150 or the manufacturer computing device 160, and the general computer 100 may be provided via the Internet, USSD, SMS, IVR, Wireless Networks, and other methods of communication.

It should be noted that while the abovementioned describes the database 200 and the general computer 100 as being two separate devices, the database 200 may instead be located within the general computer 100.

Functionality of the present invention can be implemented in software, firmware, hardware, or a combination thereof. In one exemplary embodiment, a portion of the invention is implemented in software, as an executable program, and is executed by a special or general-purpose digital computer, such as a personal computer, workstation, minicomputer, or mainframe computer. The exemplary embodiment of a general-purpose computer architecture that can implement functionality of the present invention is shown in FIG. 2.

FIG. 2 is a block diagram illustrating the general computer 100 of FIG. 1. Generally, in terms of hardware architecture, the computer includes a processor 102, memory 104, storage device 106, and one or more input and/or output (I/O) devices (or peripherals) 108 that are communicatively coupled via a local interface 110. The local interface 110 can be, for example but not limited to, one or more buses or other wired or wireless connections, as is known in the art. The local interface 110 may have additional elements, which are omitted for simplicity, such as controllers, buffers (caches), drivers, repeaters, and receivers, to enable communications. Further, the local interface 110 may include address, control, and/or data connections to enable appropriate communications among the aforementioned components.

The processor 102 is a hardware device for executing software, particularly that stored in the memory 104. The processor 102 can be any custom made or commercially available processor, a central processing unit (CPU), an auxiliary processor among several processors associated with the computer, a semiconductor based microprocessor (in the form of a microchip or chip set), a macroprocessor, or generally any device for executing software instructions.

The memory 104 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory may incorporate electronic, magnetic, optical, and/or other types of storage media. Note that the memory can have a distributed architecture, where various components are situated remote from one another, but can be accessed by the processor.

The software 112 in the memory 104 may include one or more separate programs, each of which contains an ordered listing of executable instructions for implementing logical functions of the present system, as described above. In the example of FIG. 2, the software 112 in the memory 104 defines the functionality of the present invention as is described in additional detail hereinafter. In addition, the memory 104 may contain an operating system (O/S) 114. The operating system essentially controls the execution of computer programs and provides scheduling, input-output control, file and data management, memory management, and communication control and related services.

The present invention may be provided by a source program, executable program (object code), script, or any other entity containing a set of instructions to be performed. When a source program, then the program needs to be translated via a compiler, assembler, interpreter, or the like, which may or may not be included within the memory, so as to operate properly in connection with the O/S. Furthermore, the present invention can be written as (a) an object oriented programming language, which has classes of data and methods, or (b) a procedure programming language, which has routines, subroutines, and/or functions.

The I/O devices 108 may include input devices, for example but not limited to, a keyboard, mouse, scanner, microphone, touch screen, or other devices. Furthermore, the I/O devices may also include output devices, for example but not limited to, a printer, display, or other devices. Finally, the I/O devices may further include devices that communicate via both inputs and outputs, for instance but not limited to, a modulator/demodulator (modem; for accessing another device, system, or network), a radio frequency (RF) or other transceiver, a telephonic interface, a bridge, a router, and other devices.

When the present invention is in operation, the processor 102 is configured to execute the software 112 stored within the memory 104, to communicate data to and from the memory 104, and to generally control operations of the computer 100 pursuant to the software 112. The software 112 and the O/S 114, in whole or in part, but typically the latter, are read by the processor 102, perhaps buffered within the processor 102, and then executed.

When the present invention is implemented in software, as is shown in FIG. 2, it should be noted that the present invention can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The present invention can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the present invention is implemented in hardware, the present invention can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 3:
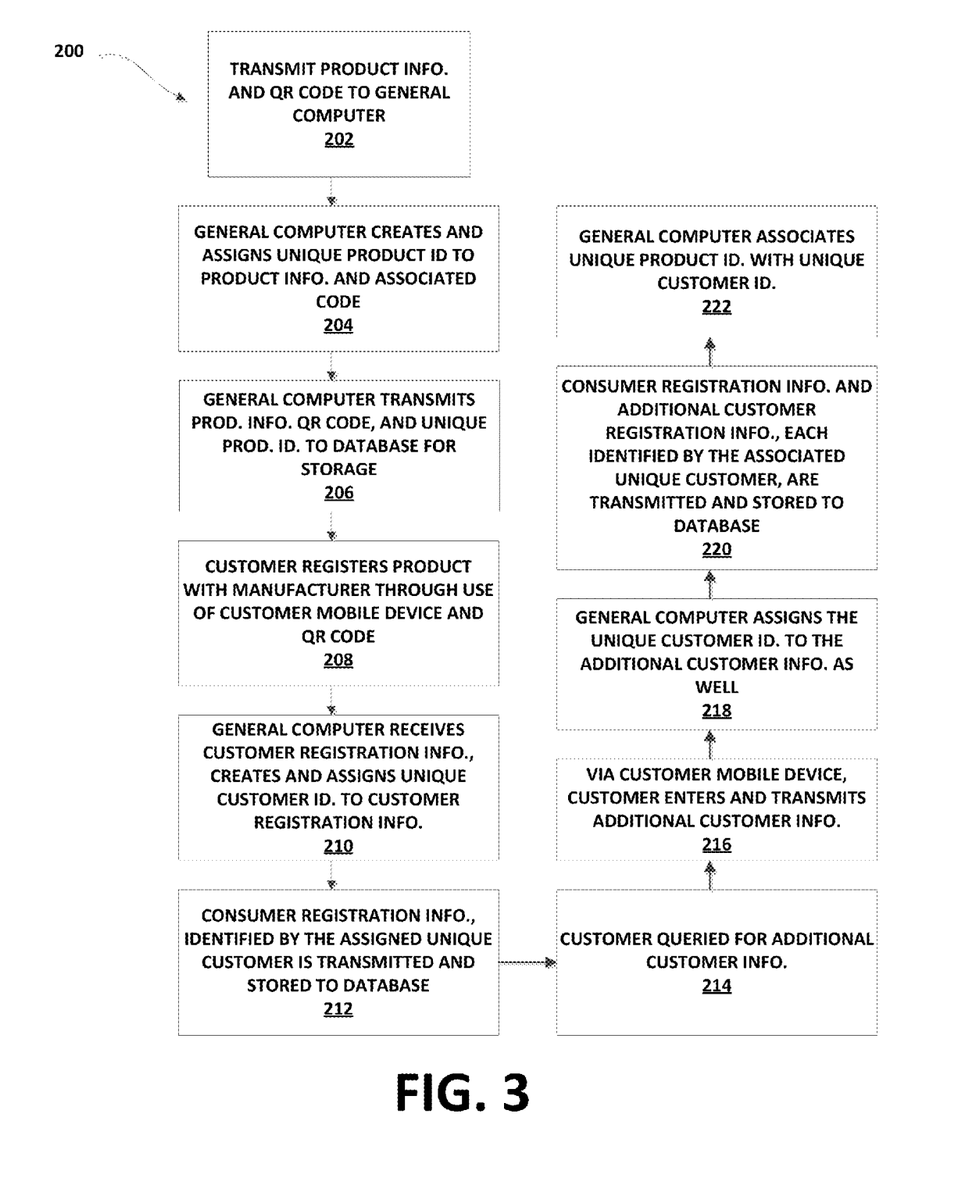
FIG. 3 is a flowchart illustrating a method of providing the abovementioned system and method for providing product data collection, monitoring, and tracking, in accordance with the first exemplary embodiment of the invention.

FIG. 3 is a flowchart 200 illustrating a method of providing the abovementioned system and method for providing product data collection, monitoring, and tracking, in accordance with the first exemplary embodiment of the invention. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention. The processes, described below are performed in combination by logic within the general computer 100, retailer computing device 150, manufacturer computing device 160, and the customer mobile device 10.

As is shown by block 202, through use of the manufacturer computing device 160, a manufacturer of a product transmits information regarding the product to the general computer 100. As previously mentioned, such product information may include, but is not limited to, a product warranty time, a product warranty description, a product name, a product UPC, a product serial number, a product manual, a unique product identifier, a list of parts of the product, pointers to parts of the product, product return information, product repair instructions, product retailer identification, product manufacturer information, an indicator that the product has been returned, an indicator that a warranty claim has been made for the product, a rebate amount given, a rebate date, and other product specific information.

The manufacturer also transmits a bar code of the product to the general computer 100, such as, but not limited to, a quick response (QR) code. It should be noted that the bar code may be any code, number, or image that may be scanned by, for example, an infrared sensor. As an example, the infrared sensor of a mobile phone may be used to scan the bar code.

The general computer 100 then creates and assigns a unique product identifier to the product information and associated bar code (block 204). Assigning the unique product identifier to the product information and associated bar code provides a relationship between the product information, associated bar code, and identifier so that each product can be validated at the customer level creating a direct correlation with an individual product and the customer who purchases that product.

The general computer transmits the product information, associated bar code, and unique product identifier to the database 200 for storage (block 206). Both the product information and the associated bar code are stored on the database 200 in a manner so as to be identified by the unique product identifier.

After purchasing the product, a customer registers the product with the manufacturer (block 208). Such registration of the product may take place in one or more known methods. As an example, the purchaser of the product may mail a product registration to the manufacturer, email a product registration to the manufacturer, or go online to register the product at a Web site of the manufacturer. In accordance with the present invention, this registration preferably takes place via use of the customer mobile device 10. Specifically, the scanning functionality of the customer mobile device 10 may be used to scan a bar code of the product, such as a QR code, which will allow the customer mobile device 10 to communicate the scanned code to the general computer 100. The general computer 100 then pulls the product information associated with the bar code from the database 200 and transmits the product information to the customer mobile device 10 for view and confirmation by the customer. The customer may then register the product with the manufacturer via their customer mobile device 10 by entering typical registration information such as, but not limited to, serial number of the product, name of the customer, phone number of the customer, address of the customer, and answering whether the customer read the terms and conditions of the warranty card associated with the product purchased. When entry is completed, the customer may use the customer mobile device 10 to transmit the registration information to the general computer 100.

As shown by block 210, upon receipt of the registration information, the general computer 100 creates and assigns a unique customer identification to the customer registration information. The customer registration information, identified by the assigned unique customer identification, is then transmitted by the general computer 100 to the database 100 where it is stored (block 212).

As shown by block 214, via the manufacturer computing device 160, the manufacturer may then query the customer for additional customer information. Such additional consumer information may include, but is not limited to, additional customer biographic information and additional customer demographic information. As shown by block 216, via the customer mobile device 10, the customer enters and transmits the additional consumer information to the general computer 100. Upon receipt, the general computer 100 then assigns the unique customer identification to the additional customer information as well (block 218).

The customer registration and additional customer information, identified by the associated unique customer identification, are then transmitted to the database 100 where they are stored (block 220). As shown by block 222, the general computer 100 then associates the unique product identifier with the unique customer identifier so as to allow for pulling of additional information, as is explained in additional detail herein.

Figure 4:
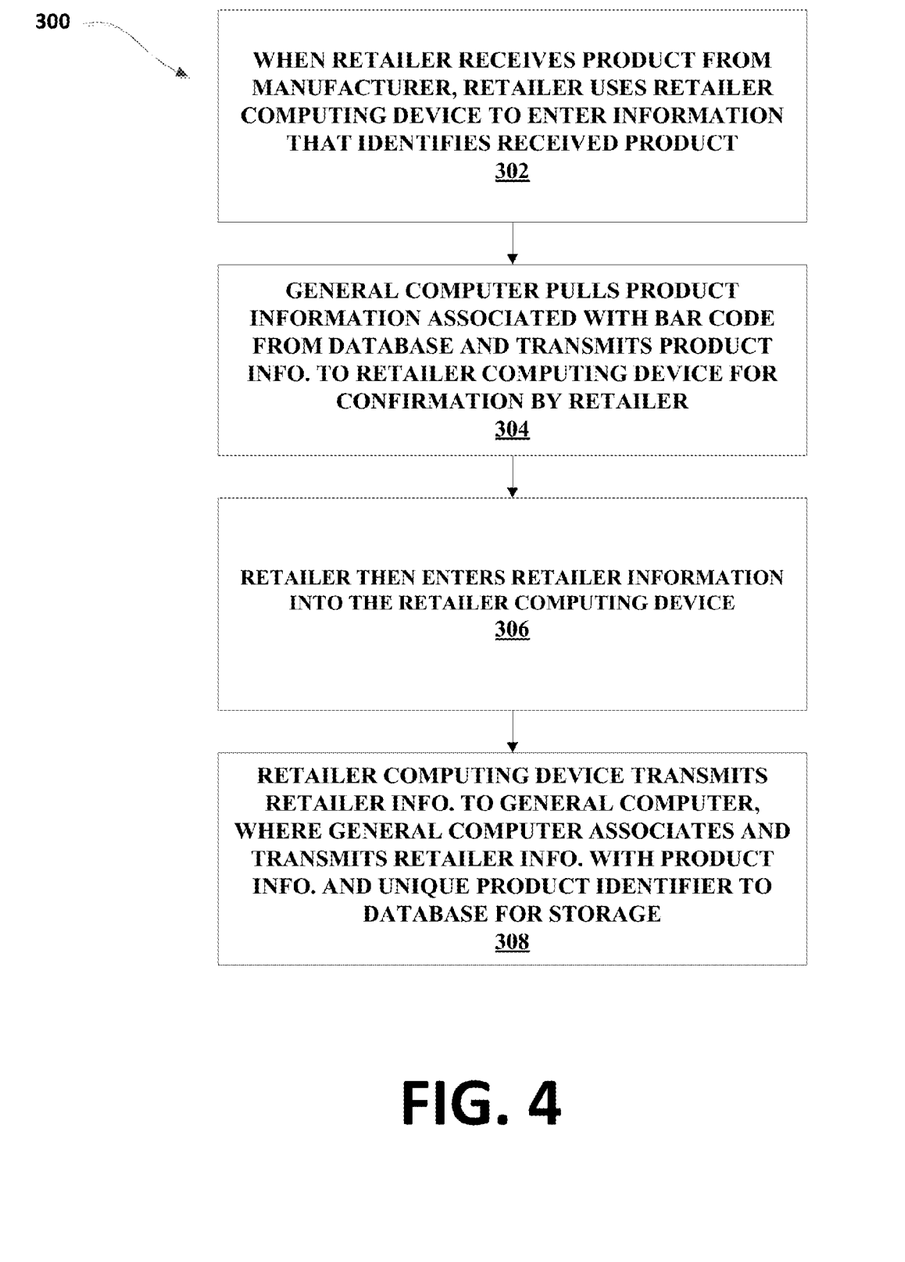
FIG. 4 is a flowchart providing an example of interaction between a retailer and the present system and method.

In accordance with an alternative embodiment of the invention, a retailer may also transmit information regarding the product to the general computer 100 for storage on the database 200. In fact, it is preferred, although not necessary, that the retailer register all products received from the manufacturer for selling. FIG. 4 is a flowchart 300 providing an example of interaction between a retailer and the present system and method. Referring to FIG. 4, when a retailer receives a product from a manufacturer, the retailer uses the retailer computing device 150 to enter information that identifies the received product (block 302). As an example, the retailer may use an I/O device of the retailer computing device 150 to scan a bar code on the product, which will allow the retailer computer device 150 to communicate the scanned code to the general computer 100. As shown by block 304, the general computer 100 then pulls the product information associated with the bar code from the database 200 and transmits the product information to the retailer computing device 150 for confirmation by the retailer.

The retailer then enters retailer information into the retailer computing device 150 (block 306). Such retailer information may include, but is not limited to, product description, price, location, date received if different from data entry, and retailer code. The retailer computing device 150 then transmits the retailer information to the general computer 100, where the general computer 100 associates and transmits the retailer information with the product information and unique product identifier to the database 200 for storage (block 308). Having the product retailer information stored with the unique product identifier allows a user of the present system and method to view retailer information associated with a sold product.

In accordance with the present invention, after the process of customer and product registration is completed, as described in detail above, when the customer scans the bar code of the product (such as a QR code), the general computer associates the scanned bar code with a specific unique product identifier and related unique customer identifier. The customer can then request any information stored in the database 200 that is associated with the product, and he/she can update his/her customer information. The customer can then perform functions such as, but not limited to, querying their product information via their customer mobile device 10. As an example, a customer my scan the QR code of a registered product The present system and method may be used in one or more different environments. As an example, as opposed to the above-described scenario of basic consumer product registration and interaction, the present system and method may be used for prescription drugs. Specifically, the expiration date on products, such as, prescription drugs, can be tracked. As an example, the consumer can be able to validate how old a drug is by scanning the quick response code on drug labels. The consumer is then able to validate ownership of the drug by entering their personal information (i.e., customer registration). The present system can also be used to refill drugs. Consumers can request a drug refill using the quick response monitoring system, which will be entered into a queue for pickup before consumer gets to pharmacy (i.e., the retailer).

As a result of the abovementioned system and method, among many other functions, a customer using the present system can track the terms and conditions of products, query the database to see if the warranty for their product is still valid, validate warranty of a purchased product, validate product data, query the system for product information, order extra parts, and performs many other functions. In addition, a manufacturer may inform customers of any changes to products and inform customers about product updates. Specifically, the present system and method provides an environment in which a manufacturer, retailer, and customer may each stay up to date regarding products, as well as provide feedback regarding the same.

In accordance with the present system and method, the customer can manage their personal quick response code that links to online data. Data can be edited or updated as a digital thumb print using the present quick response monitoring system. The quick response monitoring system can be used to monitor digital thumb print and manage consumer data. The customer has their personal quick response code that links with their information, which may also include manufacturers' coupons and rebate point systems. Coupon codes and other information can be added to personal data using the present quick response monitoring system.

It should be noted that the present system and method may also use different levels of access to data stored on the database 200. As an example, a retailer may not be able to access customer registration information; however he may be able to access product information. Such access may be controlled by a series of username and password requirements as is known by those having ordinary skill in the art.

In accordance with an alternative embodiment of the invention, instead of having the general computer as a separate device, functionality of the general computer may be incorporated into the manufacturer computing device 160, the customer mobile device 10, and the retailer computing device 150.

It is desirable to ensure the transmission of data from trusted sources are encrypted and encoded to protect the privacy of such data. Data such as health data, payment information, or other personal information are subjected to being intercepted and the encryption process described below addresses this concern. Unlike closed loop systems that are application to application on a smart device, this exemplary embodiment illustrates a generalizable solution despite the sophistication of the device; whether a simple basic mobile phone to a more complex smart phone. The device, may send data in the form of text messages, for example using Short Message Service (SMS), within a telecommunication network. The exemplary encryption embodiments manage data from any server/client; client/ server set up where data are sent via mobile phone to application (P2A).

In one exemplary embodiment, data is exchanged using SMS, which transfers packets of data from the handset of a subscriber to a cellular tower, then to a server for processing (Peer to Application (P2A)). The data from the server is captured through a Virtual Private Network (VPN) protocol and offers additional processing to determine the structure of the unstructured information.

It is useful to distinguish "data in transit" from "data at rest". Data at rest are data that are stored and processed on a server, and stored in physical form, for example, in a magnetic or optical medium. There are known measures to protect data at rest from being intercepted by third parties for unscrupulous activities. In contrast, data in transit takes into account the transmission of information through different protocols with examples such as HTTP, VPN, and SOAP.

Data are transmitted to perform an action, for example, remote computation, fetching information, or communicating a message via SMS.

Figure 5:
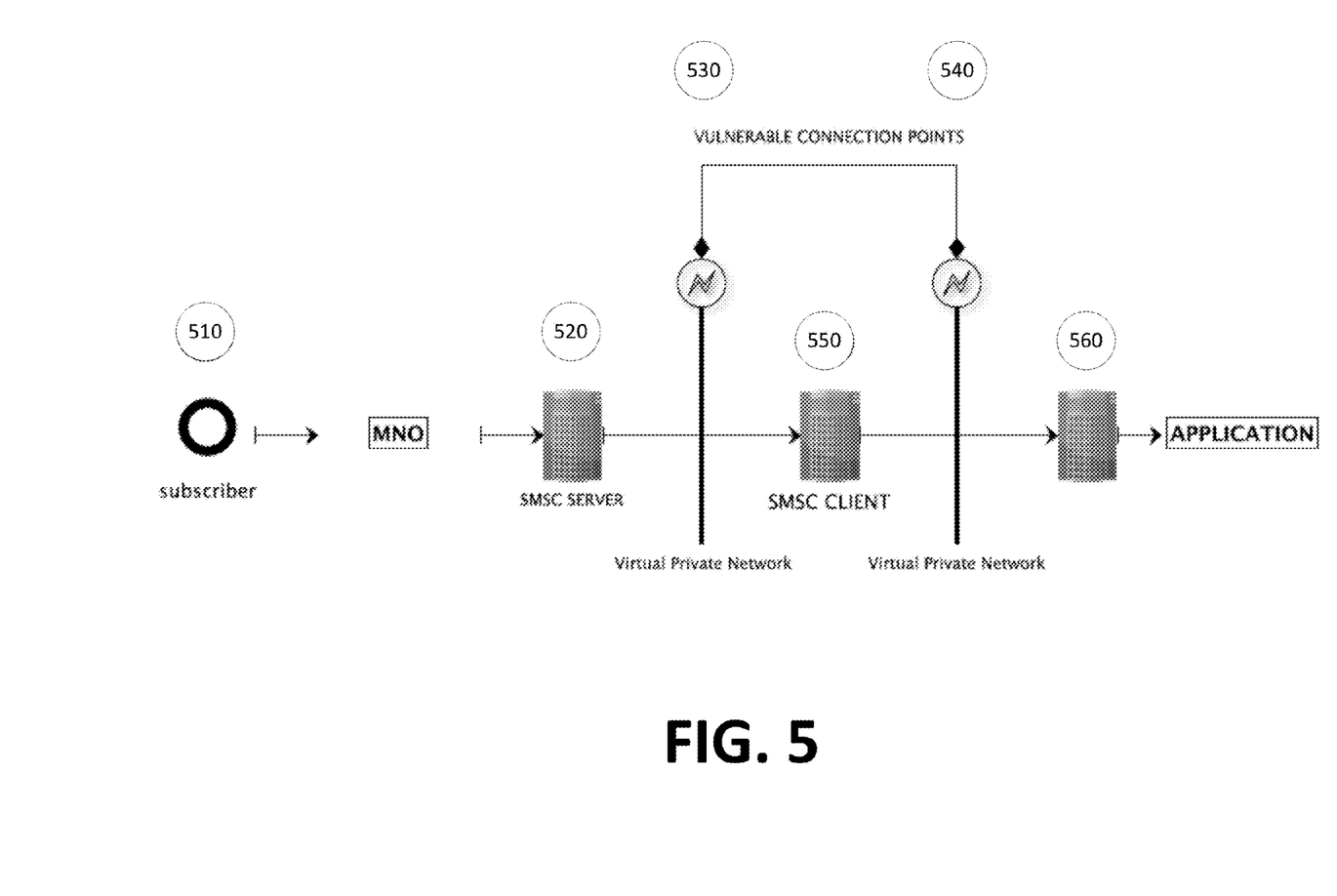
FIG. 5 is a diagram of a network carrying data of an exemplary embodiment of the current invention indicating security vulnerabilities.
Figure 6:
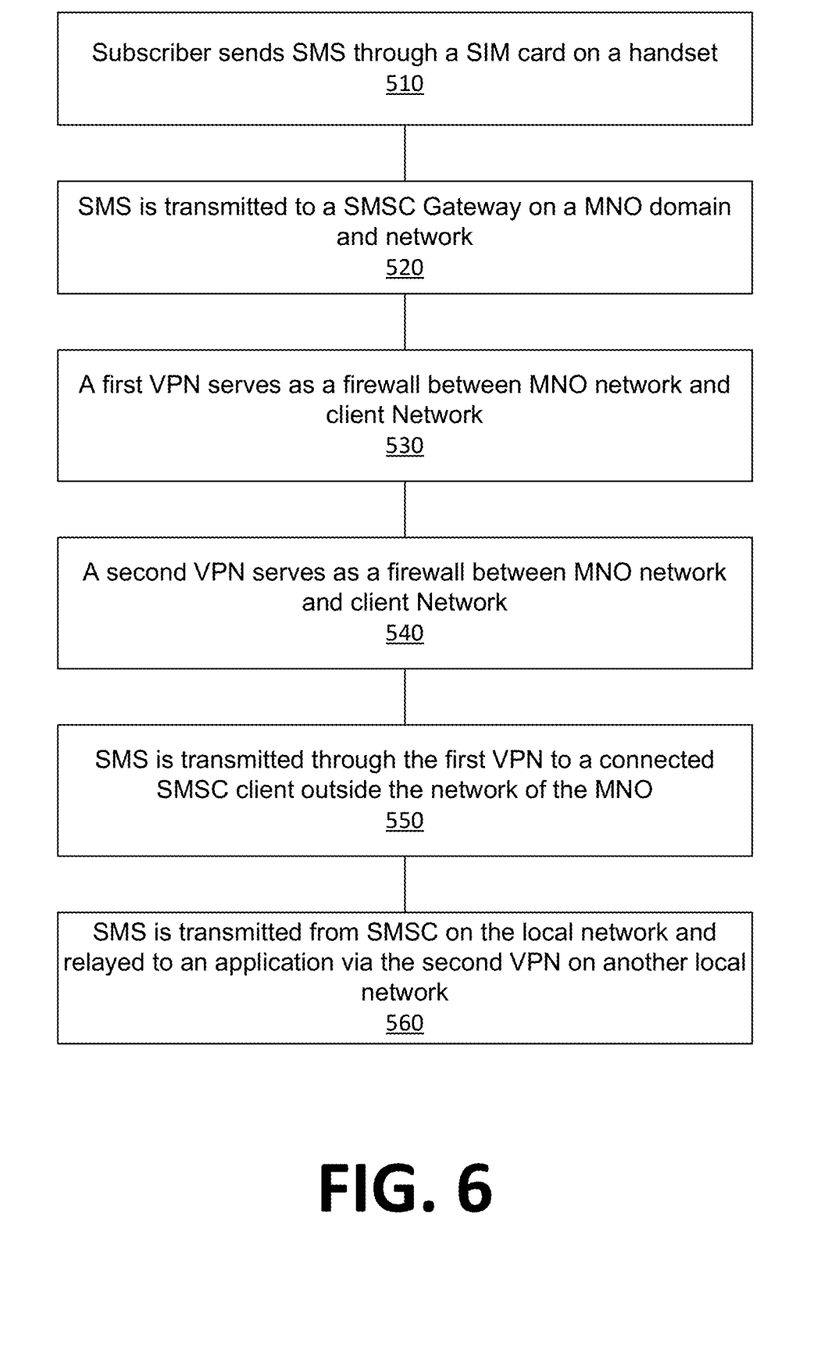
FIG. 6 is a flowchart describing the path of SMS data through a network used by an exemplary embodiment of the current invention.

The end user connects to the Mobile Network Operators through a Short Message Service Center (SMSC) gateway and a VPN. Although connected through a VPN, data in transit are susceptible at two critical points along the VPN tunnel, where the transmission transitions from one platform to the next, thereby converting data from rest to data in transit, as shown by FIG. 5 and FIG. 6.

A subscriber sends SMS through a SIM card on a handset, as shown by block 510. SMS is transmitted to a SMSC gateway on a mobile network operator (MNO) domain and network, as shown by block 520. A first VPN serves as a firewall between MNO network and client Network, as shown by block 530. A second VPN serves as a firewall between MNO network and client Network, as shown by block 540. SMS is transmitted through the first VPN to a connected SMSC client outside the network of the MNO, as shown by 550. SMS is transmitted from SMSC on the local network and relayed to an application via the second VPN on another local network, as shown by block 560.

It should be noted that in the prior art, while significant work has been done to protect data at rest with multilayer encryption, firewall protocols, or even data decoupling, previously there has been less work that addresses data in transit, specifically SMS data.

Under one embodiment, a conversion algorithm manages and secures data in transit from both SMSC connections through the VPN and a multilayer encryption and decryption protocol that prevents intercepted messages from being deconstructed into an intelligible format.

Most SMS encryption processes the encryption at the SIM card level, which requires download of patches or native systems to a mobile device. Other encryption methods rely on a secret key for encryption at the user level, such that the user decrypts and encrypts the message. The solution outlined takes a different approach making the solution universal and generalizable on how it works.

The encryption under one exemplary embodiment is automated. The messages are encrypted from the Mobile Network Operator through the tunnel and rely on a decryption process before the messages are considered to be intelligible.

In FIG. 5, it is noted that the traffic of transmitted SMS has two vulnerable and potential points to be intercepted; respectively, connection from a client (local) to a server (remote), and then again from the client (local) to an application (local). Under exemplary embodiments of the present invention, the message is encrypted along a double transmission system from the server to the client, and thereafter to the application.

The multi-state encryption of the exemplary embodiment provides for the protection and security of SMS data, where the SMS can include, for example, health information, banking information, or client to subscriber data. The multi-state encryption compresses the data at the client to server connection, which is a local/remote connection, and then again at the client to application connection, which is a local/local connection, reducing the risk of decryption if the message is intercepted. The separation of the data processing, where the SMS data are collected and analyzed, from the transmission process, minimizes the number of locations where unprotected data may be intercepted.

Data are encrypted at the mobile network such that the transmitted packet combines data that needs to be transmitted with an encryption key into a single packet. The packet is transmitted along the VPN from server to client. Once the packet passes through the network at the client level, the key is broken off from the initial packet, where the key is used to dynamically gauge where the data should be transmitted locally, for example, from the client to the application.

The encryption methodology uses a dual-network security protection such that the data are secured if intercepted. If unfamiliar packets are sent along the network to the client or the server with no encryption key attached, the data are refused. The encryption may be time constrained, such that a received message is only readable during a specified time window, and unreadable after the time window has elapsed.

The encryption may use a standard encrypting methodology, for example, but not limited to a Base64 time constrained packing algorithm. The encryption may be packed and repacked based on a time-key sequence hosted on both the server and the client.

Figure 7:
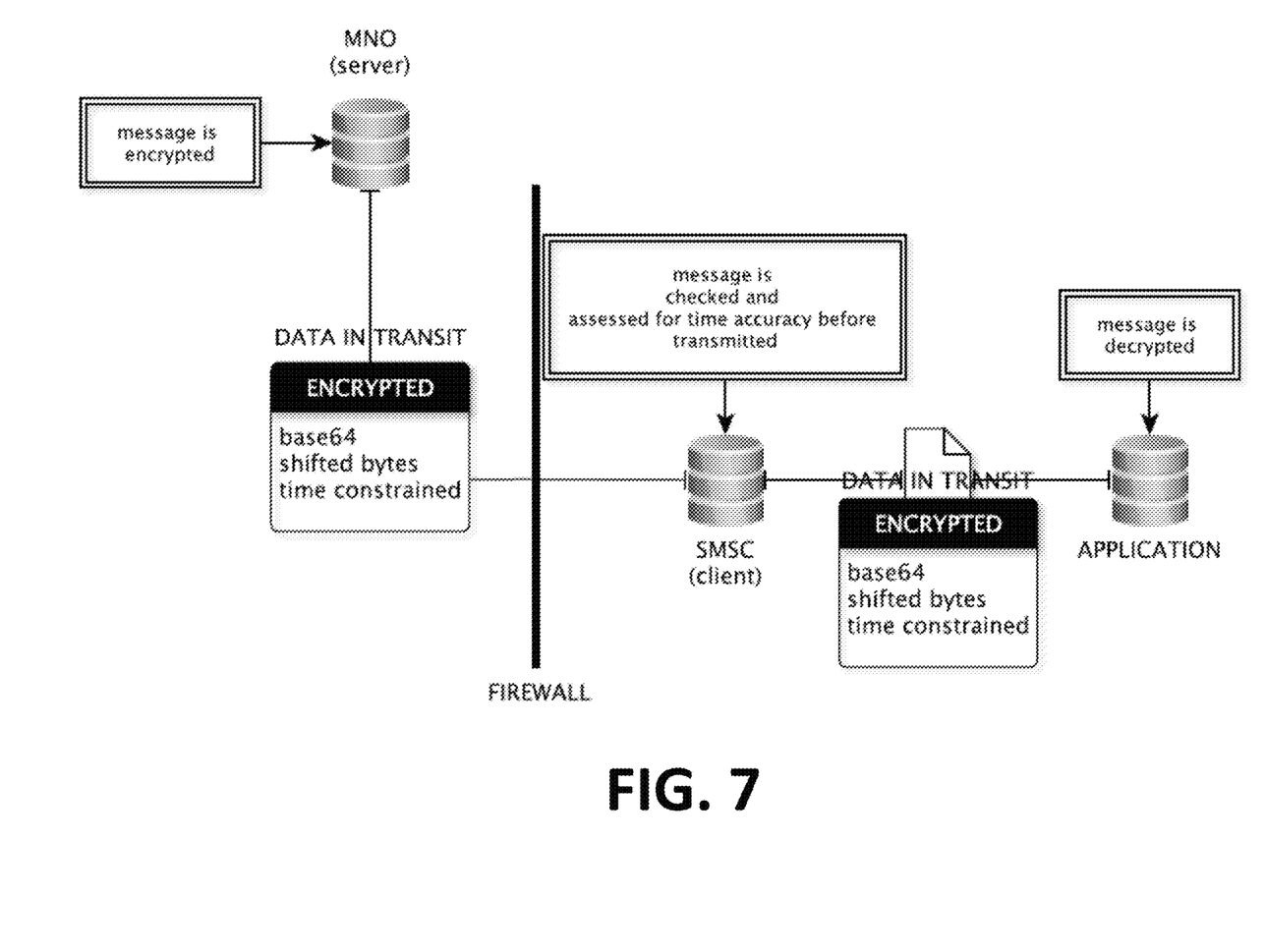
FIG. 7 is a schematic diagram of an exemplary embodiment of the encryption methodology.
Figure 8:
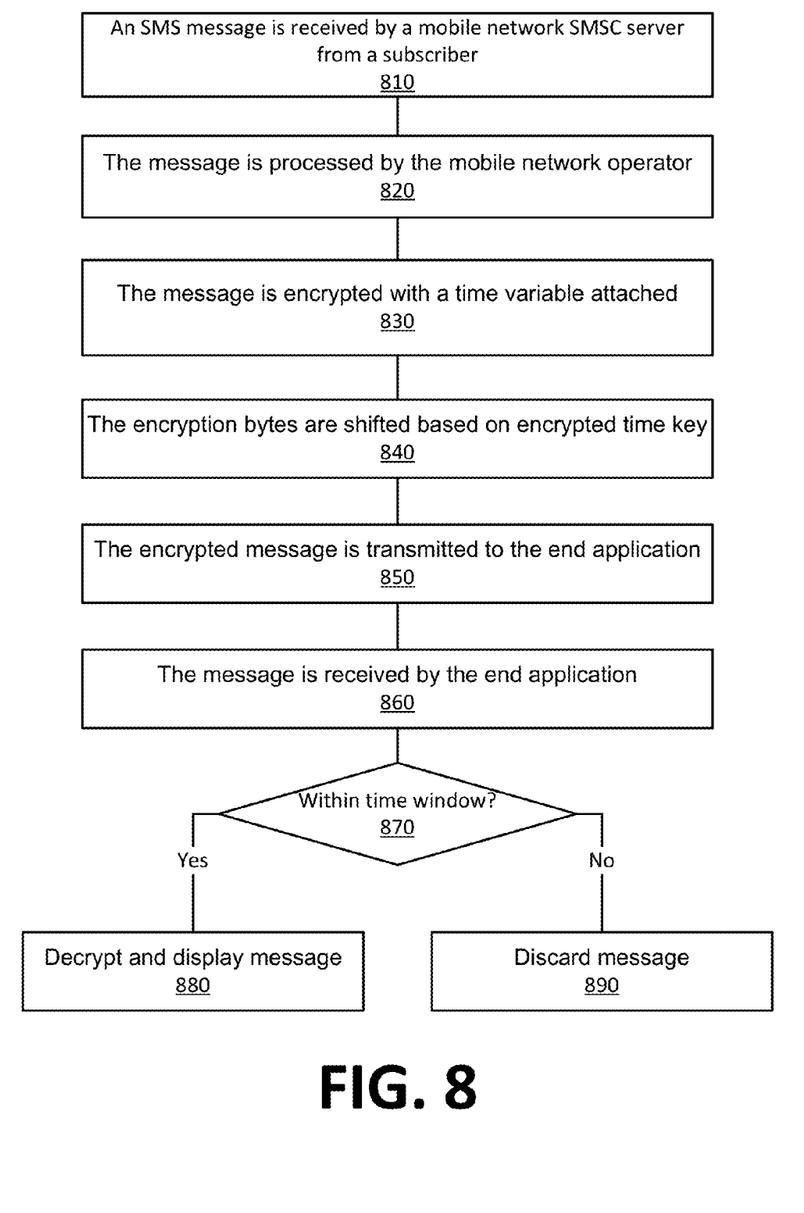
FIG. 8 is a flowchart of an exemplary embodiment of the encryption methodology.

An exemplary embodiment of the encryption methodology is shown in FIG. 7 and FIG. 8, as shown by block 810. When an SMS message is received by the mobile network from the subscriber, the message is processed by the mobile network operator with network security features in place to secure the message, as shown by block 820. Before the message is relayed through the virtual private network, the message is encrypted, for example, using a standard Base64 binary-to-text encoding scheme with a time variable attached, informing the client what time the message was encrypted, as shown by block 830. The time variable is also encrypted and scrambled with the message as a significant encrypted message.

The benefits of incorporating both encryptions jointly is that a direct decode algorithm will be insufficient to access the encrypted data, and the encrypted key acts as a further deterrent to an intruder. The encryption bytes are shifted based on the encrypted time-key, as shown by block 840. The encryption is only visible to the server and the client, such that only the server and the client will know the time transactions between messages. The message is transmitted to the end application, as shown by block 850. The message is received by the end application, as shown by block 860. The timestamp of the message is checked, as shown by block 870. If the message is within the time window, the application decrypts and displays the received message, as shown by block 880, otherwise the application discards the message, as shown by block 890. The encryption serves as a relay system by which messages interact in a closed loop system.

Figure 9:
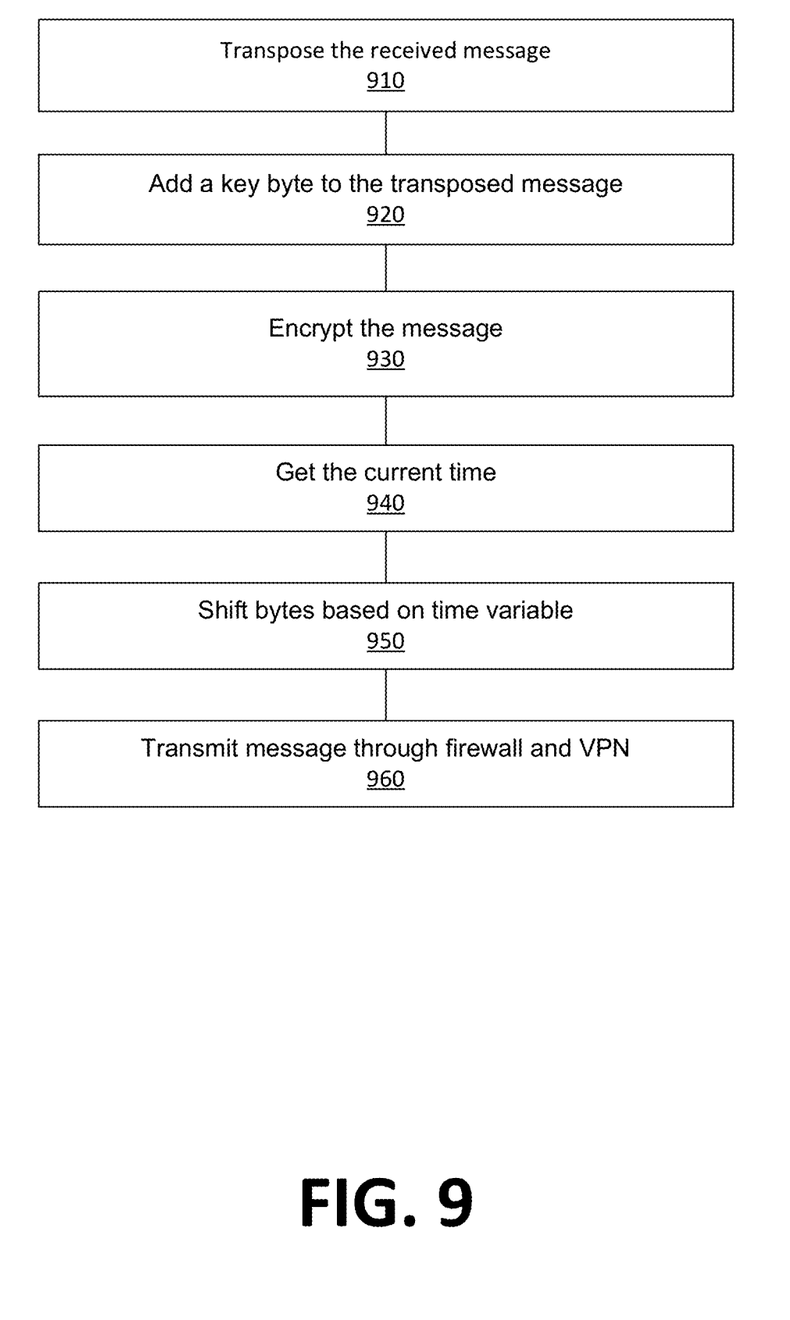
FIG. 9 is a flowchart detailing the encryption process performed by both the server and client.

A detail of the encryption process of block 830 performed by both the server and client is shown in FIG. 9. The received message is transposed, as shown by block 910. A key byte is added to the transposed message, as shown by block 920. The message is encrypted, as shown by block 930, for example, using a Base64 binary-to-text encoding scheme. The current time is obtained, for example, from a network clock source, as shown by block 940. The bytes are shifted based upon the value of the time, as shown by block 950. The encrypted message is transmitted through the firewall and VPN, as shown by block 960.

Figure 10:
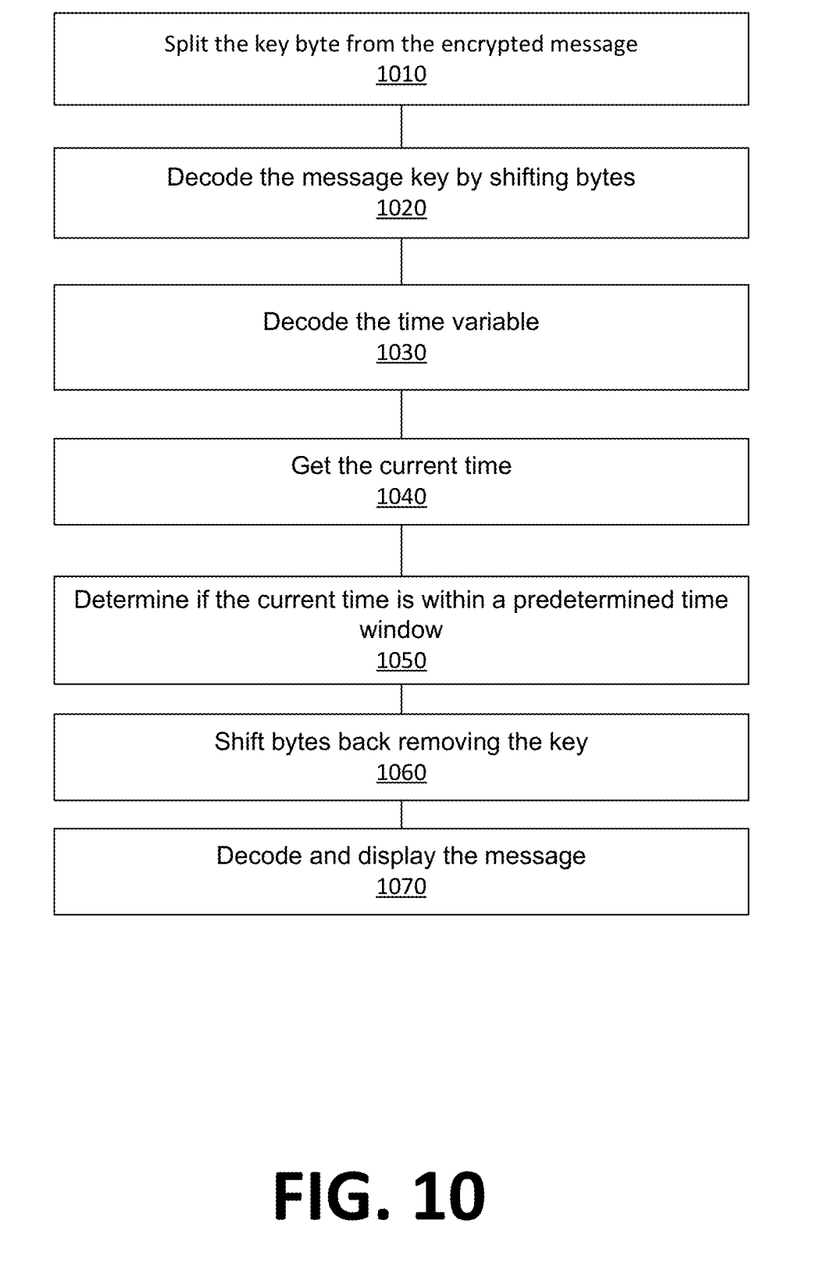
FIG. 10 is a flowchart detailing the decryption process performed by both the server and client.

A detail of the decryption process of blocks 870-880 (FIG. 8) performed by both the server and client is shown in FIG. 10. The key byte is split from the received encrypted message, as shown by block 1010. The message key is decoded by shifting bytes, as shown by block 1020. The time variable is decoded, as shown by block 1030. The current time is obtained, as shown by block 1040. It is determined whether the current time is within a predetermined time window, for example, 30 minutes, as shown by block 1050.

The key is removed by shifting bytes, as shown by block 1060. The message is decoded, for example, using a Base64 binary-to-text encoding scheme, and displayed, as shown by block 1070.

In one embodiment, the above encryption process is performed by a host application, for example, hosted on the device of the sender and/or the recipient. The recipient application may only display the received only during the time window.

The above embodiments are illustrated in the following example. The example is included for illustrative purposes, and should not be interpreted as a limitation on the above embodiments.

Both a text message and a time of data capture are encrypted using a Base64 binary-to-text encoding scheme. After encryption, a field containing the time of data capture is counted to determine the number of bytes that represent the encrypted message as the time-key. Each encoded byte of the message is shifted, and a byte from the encoded time sequence is inserted into the space in the message created by the shift. As a result, the time is packed into the sequence, representing a packed encryption with time a key attached for decryption. An example of time of data capture is:

2013-08-13 16:59:14.997731

After encoding, the encrypted time string is represented as

MjAxMy0wOC0xMyAxNjo1OToxNC45OTc3MzE=

Similarly, a text message may be received as standard ASCII characters, reading:

DOG IS BROWN that is very dirty and I can not believe how dirty it is

After encoding, the encrypted text message is represented as:

RE9HIElTIEJST1dOIHRoYXQgaXMgdmVyeSBka-XJOeSBhbmQgSSBjYW 4gbm90IGJlbGlldmUgaG93IGRpcnR5IGl0IGlz The combined encrypted full message and time is represented as:

RMEj9AHxIMEyl0TwIOECJ0SxTM1ydAOxINH-jRoo1YOxTQogxaNXCM4 g5dOmTVcy3eMSzBEk=

Therefore, the content of the encrypted message is a function of the time when the message is encrypted. For example, the same message encrypted at a different time may appear as:

RMEj9AHxIMEyl0TwIOECJ0SxTM1ydAOxINHz-RoowYMXzQogxaMXSM4gydMmjVIy5eMSzBEk=

A time-key may be appended to then end of the encrypted message, such that a device receiving the message may use the time-key to recover the message. For example, the time-key 36 may be appended to the above encrypted message transmitted to the client appears as:

RMEj9AHxIMEyl0TwIOECJ0SxTM1ydAOxINHj-Roo1YOXTQogxaNXCM4 g5dOmTVcy3eMSzBEk=36

Once the client receives the encrypted message, the time-key is stripped away to validate if the message is within an expected time window. The time-key represents the length of the encoded time. The message received by the client, as transmitted above, is:

RMEj9AHxIMEyl0TwIOECJ0SxTM1ydAOxINHj-Roo1YOXTQogxaNXCM4 g5dOmTVcy3eMSzBEk=36

This message is processed using standard Base64 decryption, resulting in the following string:

D?#?? ?2?D? ?'D?L?rt? ??F?5'??B?1h??3?9t?Ʉ xijI

The bytes are then repositioned by shifting the bytes based on the length of the encrypted time string. Repositioning reverts the message back to its encrypted state. After the repositioning, the message is decrypted using a Base64 text-to-binary decoding scheme.

In summary, the present system and method is used to track the cycle of a product from manufacturing, point of sale, to customer ownership, such that the data collected/transmitted are secure in transit. The present product tracking system is used with mobile devices, such as, but not limited to, mobile phones, which are linked to a query system for providing and obtaining specific product data about the item queried.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

I claim:

1. A system for secure SMS communication in a communication network comprising:
    a client device that receives, via a first virtual private network (VPN), a subscriber Short Message Service (SMS) message comprising structured and/or unstructured data and processing the SMS message wherein processing comprises:
        at an encryption time, encrypting the subscriber SMS message to form an encrypted message comprising a plurality of encrypted bytes; forming an encrypted time string;
        forming a time-key based upon a characteristic of the encrypted time string; forming a space in the plurality of encrypted bytes by shifting the plurality of encrypted bytes based on the time-key;
        forming a transmit message by packing the encrypted time string into the space in the plurality of encrypted bytes;
        attaching the time-key to the transmit message; and
        transmitting the transmit message via a second VPN;
    a recipient device receiving via the second VPN, the transmit message and processing the transmit message wherein the processing comprises:
        unpacking and decoding the encrypted time string to recover the encryption time; comparing the encryption time to a time window; and
        if the encryption time is within the time window, decoding and displaying the subscriber Short Message Service (SMS) message, and if the encryption time is not within the time window discarding the SMS message.

2. The system of claim 1, wherein forming the transmit message further comprises applying a Base64 binary-to-text encoding scheme.

3. The system of claim 1, wherein forming the encrypted time string further comprises the steps of:
    forming a time string from the encryption time; and
    encrypting the current time string.

4. The system of claim 1, wherein the time-key represents a length of the encrypted time string.

5. The system of claim 1, further comprising the step of splitting the time-key from the transmit message.

6. The system of claim 5, further comprising the step unshifting the plurality of encrypted bytes based on the time-key.

7. The system of claim 1, wherein the recipient device is configured to host an application.

8. The system of claim 7, wherein the recipient device comprises a customer mobile device.

* * * * *

UNITED STATES PATENT AND TRADEMARK OFFICE
CERTIFICATE OF CORRECTION

Page 1 of 1

PATENT NO. : 9,721,256 B2
APPLICATION NO. : 13/966945
DATED : August 1, 2017
INVENTOR(S) : Kenfield Allistair Griffith It is certified that error appears in the above-identified patent and that said Letters Patent is hereby corrected as shown below:

On the Title Page

At (73): Assignee's name is listed as "Massachusetts Institue of Technology". Assignee's correct name is "Massachusetts Institute of Technology".

Signed and Sealed this
Tenth Day of April, 2018

Andrei Iancu
*Director of the United States Patent and Trademark Office*